(12) United States Patent
Stubbers et al.

(10) Patent No.: US 9,213,112 B2
(45) Date of Patent: Dec. 15, 2015

(54) NEUTRON RADIATION SENSOR

(71) Applicant: STARFIRE INDUSTRIES, LLC, Champaign, IL (US)

(72) Inventors: Robert A. Stubbers, Champaign, IL (US); Darren A. Alman, Mahomet, IL (US); Brian E. Jurczyk, Champaign, IL (US); Matthew D. Coventry, Champaign, IL (US)

(73) Assignee: Starfire Industries, LLC, Champaign, IL (US)

( * ) Notice: Subject to any disclaimer, the term of this patent is extended or adjusted under 35 U.S.C. 154(b) by 0 days.

(21) Appl. No.: 14/217,135

(22) Filed: Mar. 17, 2014

(65) Prior Publication Data

US 2014/0264048 A1  Sep. 18, 2014

Related U.S. Application Data

(60) Provisional application No. 61/793,075, filed on Mar. 15, 2013.

(51) Int. Cl.
*G01T 3/06* (2006.01)
*G01T 3/08* (2006.01)

(52) U.S. Cl.
CPC .......................... *G01T 3/08* (2013.01)

(58) Field of Classification Search
CPC ................... G01T 3/06; G01T 3/08
See application file for complete search history.

(56) References Cited

U.S. PATENT DOCUMENTS

| 4,788,581 | A | 11/1988 | Knoll et al. |
| 5,739,541 | A | 4/1998 | Kahilainen |
| 6,043,508 | A | 3/2000 | Oikari et al. |
| 7,372,009 | B1 | 5/2008 | Losee et al. |
| 7,977,643 | B2 * | 7/2011 | Weinberg ................. 250/370.01 |
| 2009/0179155 | A1 | 7/2009 | Weinberg |
| 2011/0233420 | A1 | 9/2011 | Feller et al. |

FOREIGN PATENT DOCUMENTS

RU  1579238 A1  4/1995

OTHER PUBLICATIONS

International Search Report for pending International Application No. PCT/US2014/030801, dated Jan. 15, 2015.
International Preliminary Report in co-pending International Application No. PCT/US2014/030801, dated Sep. 24, 2015.

* cited by examiner

*Primary Examiner* — David Porta
*Assistant Examiner* — Faye Boosalis
(74) *Attorney, Agent, or Firm* — Leydig, Voit & Mayer, Ltd.

(57) ABSTRACT

Embodiments utilize high energy particles generated by nuclear reactions involving neutron radiation and neutron-sensitive materials to generate and maintain an electric potential gradient between an electrode and a region separated from the electrode by an electric insulator. System and methods contemplated by the invention thereby enable passive detection of neutrons without an externally applied electric potential bias by maintaining a charge accumulation facilitated by nuclear reactions involving neutrons. The charge accumulation produces an electric potential gradient within an electric insulator that separates the charge accumulation from an exterior region.

20 Claims, 10 Drawing Sheets

NEUTRON RADIATION SENSOR

CROSS-REFERENCE TO RELATED APPLICATIONS

This application claims priority to U.S. Provisional Patent Application Ser. No. 61/793,075, titled "Neutron Radiation Sensor" and filed on Mar. 15, 2014, the contents of which are expressly incorporated herein by reference in their entirety including the contents and teachings of any references contained therein.

STATEMENT REGARDING FEDERALLY SPONSORED RESEARCH OR DEVELOPMENT

The United States Government may have certain rights in the invention pursuant to contract number W31P4Q-12-C-0131 awarded by the Department of Defense.

FIELD OF THE INVENTION

This invention relates to the field of neutron sensors, and more particularly to neutron sensors that utilize nuclear interactions involving neutrons and neutron-sensitive materials to facilitate the production and maintenance of an electric potential gradient.

BACKGROUND OF THE INVENTION

Electronic neutron radiation detection has applications in a number of industries including but not limited to non-destructive imaging, personnel dosimetry, exposure monitoring, and medicine. A number of actively powered electronic radiation sensors that require specialized electronics to read radiation are available on the market today. Typically, such devices utilize gas-filled proportional counters (e.g., $^3$He or $BF_3$ tubes), glass fiber detectors, or crystal scintillators. Such devices provide real-time readings and dosage information but are simultaneously bulky and delicate and moreover, are costly to use. Semiconductor-based neutron sensors with an active bias, such as surface-barrier diodes, proton-recoil detectors, cadmium-zinc telluride (CZT), and boron-doped semiconductor devices provide alternatives that are smaller and easier to handle. Nevertheless, such actively biased semiconductor devices require external power sources and electronics for neutron detection and counting.

SUMMARY OF THE INVENTION

A system is described herein for detecting exposure to neutrons that includes a neutron-sensitive material configured to eject, via nuclear reactions, high energy particles, wherein the high energy particles produce charge carriers in at least one of an interior electrode and an electric insulator, wherein the interior electrode is configured to accumulate a portion of the charge carriers produced by the high-energy particles, and wherein the electric insulator is disposed between the interior electrode and an exterior region and configured to inhibit propagation of the charge carriers collected by the interior electrode to the exterior region to maintain an electric potential difference between the interior electrode and the exterior region.

A method is described herein for detecting exposure to neutrons that includes providing an interior electrode, a neutron-sensitive material, and an electric insulator, producing high-energy particles from the neutron sensitive material via nuclear reactions involving neutrons, generating, by the high-energy particles, charge carriers in at least one of the electrode and the electric insulator, accumulating a portion of the charge carriers generated by the high-energy particles on the electrode, disposing the electric insulator between the interior electrode and an exterior region to maintain an electric potential difference between the interior electrode and the exterior region, and detecting the electric potential difference between the interior electrode and the exterior region.

A system is described herein for detecting neutrons that includes a plurality of neutron-sensors, each neutron sensor including neutron-sensitive material configured to eject, via nuclear reactions, high energy particles, wherein the high energy particles produce charge carriers in at least one of an interior electrode and an electric insulator, wherein the interior electrode is configured to accumulate a portion of the charge carriers produced by the high-energy particles, and wherein the electric insulator is disposed between the interior electrode and an exterior region and configured to inhibit propagation of the charge carriers collected by the interior electrode to the exterior region to maintain an electric potential difference between the interior electrode and the exterior region.

BRIEF DESCRIPTION OF THE DRAWINGS

The invention will be described in even greater detail below based on the exemplary figures. The invention is not limited to the exemplary embodiments. All features described and/or illustrated herein can be used alone or combined in different combinations in embodiments of the invention. The features and advantages of various embodiments of the invention will become apparent by reading the following detailed description with reference to the attached drawings which illustrate the following.

DETAILED DESCRIPTION OF THE INVENTION

There has been some development of photon-sensitive electronics where transistor or component properties are altered due to interaction with external radiation, such as charge-carrier generation. The radiation sensitive field effect transistor (RADFET) device is one such example of the prior art used for detecting high-energy electrons and photons.

Radiation sensing transistors have been around for some time. For example, metal oxide semiconductor (MOS) dosimeters detect neutrons as a result of the generation of electron-hole pairs in the oxide of a MOS structure. However, a voltage must be applied to the transistor gate during detection so that electrons are drawn away from the oxide and through the gate electrode thereby causing holes to migrate to the semiconductor-oxide interface where they are captured. The captured holes leave behind a positive charge that modifies the threshold voltage of the MOS transistor. The change in threshold voltage of the MOS transistor (from an initial threshold voltage exhibited prior to neutron exposure) provides a means of ascertaining a level of neutron exposure. However, in order for such MOS dosimeters to be operable, a bias voltage must be applied during radiation detection. A further disadvantage of such MOS dosimeters is that the device cannot be electronically reset, i.e. once the positive charge begins to accumulate in the oxide layer it cannot be removed.

A later MOS dosimeter (U.S. Pat. No. 4,788,581) improves on the concept by using a floating-gate as the positive charge accumulator instead of the oxide, so that the there is no permanent damage and the dosimeter is resettable. The charge is still generated in the insulator, and a second gate electrode must be biased during radiation exposure to force charges to the floating gate.

Later patents (e.g. U.S. Pat. Nos. 5,739,541 and 6,043,508) describe a direct ion storage (DIS) radiation detector comprised of a MOSFET with a floating gate that is pre-biased. As ionizing radiation passes through the device, ionizations occur within an adjacent volume of gas in contact with the exposed gate electrode. The pre-bias on the gate causes liberated electrons from the gas to collect on the gate, thereby gradually drawing down its bias, which is subsequently readable without interfering with the bias. These are limited to direct ionization of gas by the radiation. The MOSFET is just a way to detect small amounts of charge, since the current allowed through the transistor depends so strongly on the gate bias. The radiation detection mechanism itself is similar to a conventional ionization chamber.

For passive time-integrated neutron detection, thermo-luminescent dosimeters (TLD) are commonly used to determine the level of personnel radiation exposure. Unfortunately, these devices are processed and read after a long period of potential exposure, providing no real-time or remote feedback. They do have the advantage of being small, lightweight and unpowered. The only real-time passive option is the bubble dosimeter but it is bulky, subjective in analysis and more qualitative in interpretation since it is a visual image instead of quantitative output.

Personnel dosimetry, as required in industries such as nuclear power, medical and naval, typically relies on TLD badges to determine exposure. These devices are small enough to wear clipped to a shirt and they accumulate exposure by radiation damage, including damage from x-ray, charged particle and neutron radiation. After exposure, the badges are processed, typically in a thermoluminescent reader that counts the number of flashes of light when the material is annealed, thus inferring dose. This process is lengthy, requires labor and does not provide in-field data for remote or time-sensitive applications. An alternative, active, approach uses an embedded He-3 detector for neutron sensitivity, though it is expensive, bulky and requires continuous power to operate. This active option also requires different sensor platforms for detection of x-rays, charged particles and neutrons, making it inflexible.

Another passive way to measure integrated neutron dose is using materials that are made radioactive (via neutron absorption or inelastic scattering) by neutron exposure and then measuring the subsequent activity. These activation foils do not need power but the hardware to record induced activity does. Activation foils are limited by the nuclear decay half-life of the activated product; this limits the time window to observe the induced activity and the duration of measurement required for sufficient signal. Since the half-lives are fixed for a given activation foil and the detection window (how long after one can observe the radioactivity) and amount of time required to quantify the activation are inextricably tied, activation foils are very inflexible.

Neutron-based imaging (radiography) is a powerful tool for non-destructive testing and evaluation that compliments more traditional x-ray techniques due to differences in how x-rays and neutrons interact with matter. Neutron images are typically taken with film and subsequently developed. In x-ray imaging there has been a major shift away from conventional film exposure to digital imaging over the past 10 years; electronic flat panel detectors using amorphous silicon with cesium iodide external scintillators are coupled to thin-film CMOS transistors or charge-coupled devices for read out. Neutron radiography has lagged in this conversion and still uses high-resolution photo-sensitive films with converter screens using thin foils due to the nature of neutron interaction. A drawback to both film and digital methods currently used is that the image cannot be read until the exposure is over, resulting in under or over exposures leading to additional testing on patients and objects under test.

Package tracking with small, inexpensive sensors or tags are ideal to determine if a container or package is damaged during shipping. For example, thermal tags, moisture sensors, accelerometers, humidity blisters, etc. are used. Such sensors can be coupled with simple communication devices to transmit over short distances, e.g. RFID technologies or wireless communication.

Systems, methods, and apparatuses are described herein for passively, i.e. without an externally applied electric potential bias, sensing neutrons. The invention contemplates the use of neutron-sensitive materials that have a high neutron cross-section, i.e. materials that exhibit a high probability of undergoing nuclear reactions when interacting with neutrons. Examples of neutron-sensitive materials include hydrogen, beryllium, lithium, boron, cadmium, indium, and gadolinium, either in the form of naturally occurring isotopes or in the form of artificially enriched isotopes. Though systems and apparatuses described herein are capable of passively sensing neutrons (they are not actively powered), they may be capable of sensing neutrons with an active bias as well. Illustrative embodiments include a neutron-sensitive capacitor capable of use as a floating gate in a metal-oxide semiconductor field effect transistor (MOSFET) or as a floating gate in a metal-oxide semiconductor capacitor (MOSCAP or MOS capacitor).

Illustrative embodiments utilize neutron-sensitive materials electrically isolated from their surroundings by an insulating dielectric. Such assemblies enable the passive detection of neutrons without requiring an externally applied bias by building up a residual charge within the neutron-sensitive material in response to interactions with neutrons incident upon the neutron-sensitive material. The residual charge is inhibited by the insulating dielectric from leaking out of the neutron-sensitive material.

The properties of a neutron-sensitive material, e.g., a material containing gadolinium (Gd), and an insulating dielectric are utilized to create a bias voltage in response to neutron exposure. Neutron-sensitive materials can be integrated into an electronic device, such as a capacitor or transistor, and the resulting bias can affect the optoelectronic properties in the surrounding region, such as capacitance, p- or n-channel effects, charge-carrier mobility, and optical properties. For example, a neutron interacting with a material can generate high-energy electrons that exit a local region resulting in the material having a net positive charge. In another example, nuclear interactions can stimulate charge carrier generation through electronic scattering and ionization within a semi-insulating or semi-conducting region. Band engineering and built-in potentials can amplify this effect.

In one embodiment, the radiation-sensitive material is configured in a MOSFET configuration. Nuclear reactions (interactions) resulting from accumulated neutron dose will leave a residual charge on the gate. The resulting electric field will affect the device conduction properties, leading to a correlated value for the accumulated neutron exposure that can be read or inferred by external means. The gate may be a conductor, but it not a requirement for such a device to function. Net charge in a dielectric material near a semiconductor can also create an electric field that modulates the semiconductor charge-carrier density and, thereby, conductivity.

In another embodiment, the neutron-sensitive material sample is configured in a capacitor configuration. The capacitor would self-bias under neutron exposure to build up charge that can be used for another purpose, including, but not limited to: biasing an external component, actuating a MEMS device, creating a plasma or completing a circuit.

In another embodiment, the radiation-sensitive material sample is configured in a metal-oxide-semiconductor capacitor (MOSCAP) configuration. The change in capacitance will shift based on the accumulated neutron exposure; this change can then be measured and neutron exposure inferred. The MOSCAP embodiment relies on the same physics as the MOSFET embodiment, but the changes in charge-carrier density in the semiconductor manifest as a change in capacitance instead of a change in conductivity.

Such neutron-sensitive components can be constructed into logic circuits or gate arrays such that accumulated dose or neutron exposure can be easily determined or calculated with simple probing. Applications for these embodiments include, but are not limited to, a standalone or discrete element on a printed circuit board (PCB), an integrated circuit (IC), wearable personnel dosimeter, electronic film, or a radiation sensor for objects, vehicles, packages or cargo containers. Further, an array of such devices can comprise a neutron detection screen for neutron radiography. These embodiments can account for dielectric leakage, temperature effects and material property changes.

Advantages of the invention over prior art devices may include the ability to detect neutron radiation in a compact form factor with little maintenance or power needs. Certain embodiments use the floating gate electrode of a MOSFET or the radiation-sensitive electrode of a capacitor itself to both interact with the radiation and accumulate a net charge, allowing a simpler design with no gas cavity, no required hermetic seal, and the potential for a fully encapsulated gate to lower leakage current. With proper material selection and band-engineering, long-range built-in potentials across semi-insulators can amplify charge carrier generation. The resulting devices can be smaller in size, require no bias during radiation detection nor pre-biasing of electrodes. However, pre-biasing can optionally be employed to, e.g., adjust device sensitivity by adjusting the transistor to a bias close to its threshold voltage so that lower amounts of charge are required for it to switch between an off and an on state.

Advantages of the invention may enable reductions in operation and production costs of neutron generators as well as reductions in the size of devices. One embodiment is a miniature sensor that can be coupled with inexpensive readers and communications equipment, such as wireless inductive transceivers, e.g., RFID tags. RFID technologies can be useful for immediate reading of neutron dose from the sensor without expensive readers or hardware. The neutron-sensitive, zero-power sensor according to the embodiment can be attached to a RFID tag, placed on the shirt of a first-responder in a crisis, and remotely read to assess radiation exposure. Another embodiment is a long-duration passive neutron monitoring device capable of replacing TLD and other badge-type technology. A further embodiment is a passive neutron sensor coupled to an RFID tag configured to determine, e.g., if a container is damaged or tampered with during shipping. A further embodiment is a miniature radiation sensing devices configured to measure a neutron dose to which a patient is exposed in real time for certain therapies, e.g. neutron-capture therapy. Such an embodiment can be small enough to be inserted into the human body for radiation therapy monitoring.

Figure 1A:
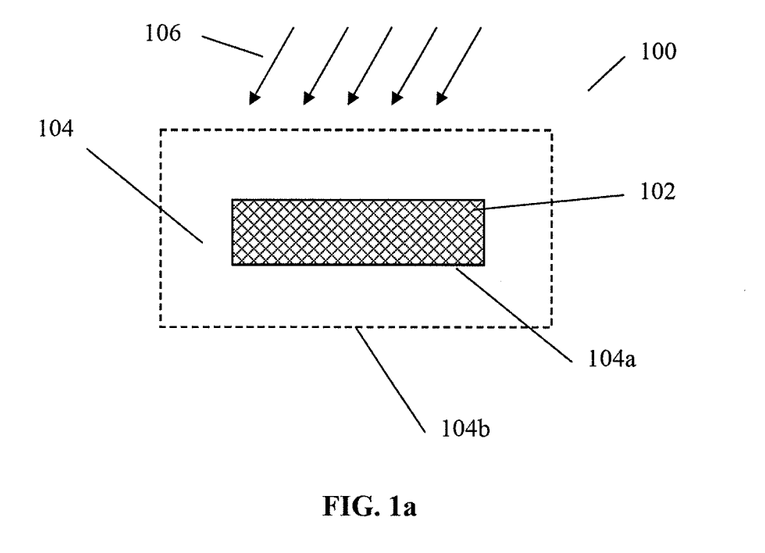
FIG. 1(a) depicts a cross-sectional view of a neutron sensing device being bombarded by incident neutrons according to an aspect of the invention.

FIG. 1(a) depicts a cross-sectional view of a neutron sensing device 100 being bombarded by incident neutrons 106. The neutron sensing device 100 consists of an electrode 102 bordered or surrounded by an insulating material 104. In various embodiments, neutron-sensitive material is coated on the surface of the electrode 102, integrated within the electrode 102, used to construct the electrode 102, or integrated within the insulating material 104. The insulating material 104 includes an inner surface 104a and an outer surface 104b. In the embodiment depicted in FIG. 1, the inner surface 104a of the insulating material 104 encloses a region occupied by the electrode 102. The insulating material 104 thereby electrically insulates the electrode 102 from a region external to an outer surface 104b of the insulating material 104. By electrically insulating the electrode 102 from external regions, the insulating material 104 inhibits leakage of any charge built up on the electrode. Incident neutrons 106 enter the neutron sensing device 100 and interact with the neutron-sensitive material via nuclear reactions. The neutron-sensitive material may be, e.g., gadolinium or lithium. Gadolinium has a very high cross section of interaction with neutrons, especially thermal neutrons and nuclear reactions involving gadolinium nuclei and neutrons can eject high-energy electrons with energies in excess of 50 keV. The use of enriched gadolinium in the form of isotope Gd-157 can increase the neutron sensitivity as compared to naturally occurring gadolinium isotopes. High-quality silicon oxides with low electrical charge leakage characteristics can be used for the insulating material 104. Low-band bap semiconductors, such as silicon, that easily generate electron-hole pairs can also be used for the insulating material 104. Additional materials capable of being used for the insulating material 104 include polymers, plastics, and waxes, e.g. paraffin. Neutron-sensitive materials, such as lithium compounds, can readily be integrated into such materials.

Figure 1B:
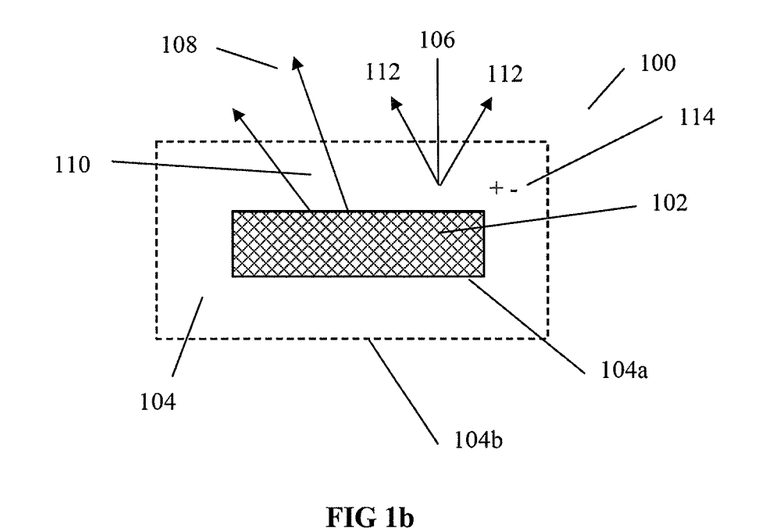
FIG. 1(b) depicts a cross-sectional view of a neutron sensing device emitting high-energy particles according to an aspect of the invention.

FIG. 1(b) depicts a cross-sectional view of a neutron sensing device 100 emitting high-energy particles 108. The high-energy particles 108 are produced by nuclear reactions involving the incident neutrons 106 and the neutron-sensitive material within the neutron sensing device 100. The high-energy particles 108 include electrons, protons, photons, neutrinos, and fission products. The high-energy particles 108 transport charge to and from the electrode 102 and generate secondary charges 110, such as electron-hole pairs, within the insulating material 104. If there is a difference in the electric potential of the inner surface 104a and the electric potential of the outer surface 104b, secondary charges 110 will, depending on their charge, drift to the inner surface 104a for collection on the electrode 102 or drift to the outer surface 104b. The drifting of the secondary charges 110 contributes to the difference in the electric potential of the inner surface 104a and the electric potential of the outer surface 104b. In various embodiments, the neutron sensing device 100 is constructed to enhance the difference in the electric potential of the inner surface 104a and the electric potential of the outer surface 104b contributed by the secondary charges 110. For example, neutron-sensitive material can be embedded within the insulating material 104. Neutron-sensitive material embedded within the insulating material 104 interacts with the incident neutrons 106 depicted in FIG. 1(a) to produce additional high-energy particles 112 via nuclear reactions. The additional high-energy particles 112 travel through the insulating material 104 in multiple directions and produce additional secondary charges 114. Increasing the number of secondary charges produced per incident neutron increases the efficiency of the neutron sensing device 100.

Figure 1C:
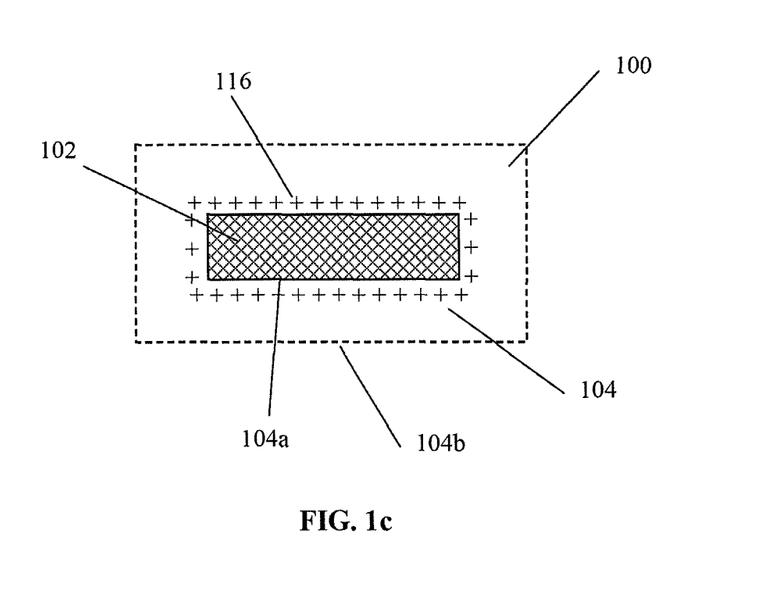
FIG. 1(c) depicts a cross-sectional view of a neutron sensing device having an electrode that has an accumulated electric charge according to an aspect of the invention.

FIG. 1(c) depicts a cross-sectional view of a neutron sensing device 100 having an electrode 102 that has an accumulated electric charge 116. In the embodiment depicted in FIG. 1(c) the accumulated electrical charge 116 is a positive charge which results from the ejection of high-energy electrons. However, in alternative implementations, materials may be selected and configured such that positive charge carriers are ejected, from the electrode 102 thereby leaving a negative charge on the electrode 102. The drifting of the secondary charges towards the inner surface 104a and outer surface 104b of the insulating material 104 also contributes to the accumulated electrical charge 116. The insulating material 104 has sufficiently high insulating strength to minimize the loss of charge on electrode 102 and thereby allow an electric potential gradient to form and increase in magnitude with increased cumulative neutron exposure. Using materials with very high resistance, large band-gap, high purity and uniformity can minimize electrical leakage. The accumulated electrical charge 116 on the electrode is related to the level of neutron exposure experienced by the electrode 102. Therefore, presence of the accumulated electrical charge 116 indicates exposure to neutrons, while the magnitude of the accumulated electrical charge 116 can be utilized to infer the level, or magnitude, of the neutron exposure.

Figure 2:
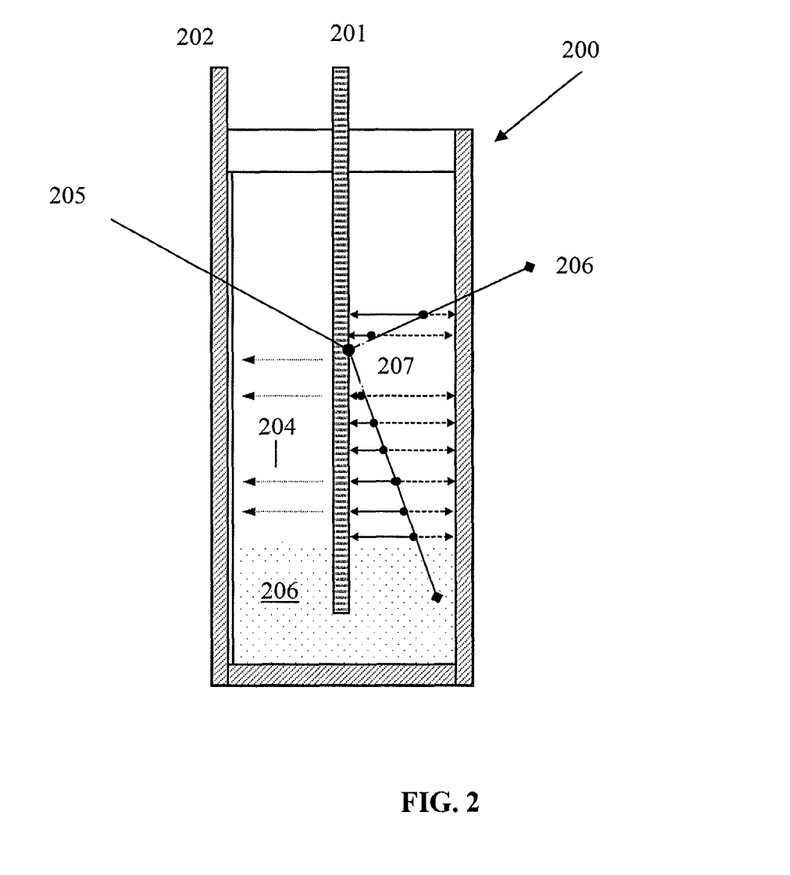
FIG. 2 depicts a neutron sensing device having a neutron-sensitive electrode configured to possess a built in electric potential difference relative to an opposing electrode according to an aspect of the invention.

FIG. 2 depicts a neutron sensing device 200 having a neutron-sensitive electrode 201 configured to possess a built in electric potential difference relative to an opposing electrode 202. The neutron sensing device 200 includes the neutron-sensitive electrode 201, which is coated with a neutron-sensitive material, the opposing electrode 202, and an electric insulator 203. The electric insulator 203 may be formed from an insulating material or a semi-insulating material including polyolefin, paraffin, silicon oxide, and amorphous silicon. The materials used to construct the neutron-sensitive electrode 201 and the materials used to construct the opposing electrode 202 can be selected such that an electric potential gradient 204 is created between the two electrodes. In various embodiments, the electric potential difference 204 between the neutron-sensitive electrode 201 and the opposing electrode 202 is the result of differences in materials with respect to work function, dopant type, dopant concentration, and surface binding potential for charge carriers. In other embodiments, the electric potential difference 122 may be the result of pre-biasing. For example, an external electrical circuit (not pictured) can apply a voltage to one or both of the neutron-sensitive electrode 201 and the opposing electrode in order to generate the electric potential gradient 204. The electric potential gradient 204 would degrade as the neutron sensing device 200 is exposed to incident neutron radiation 205 and generates high-energy particles 206 and secondary interaction charge carriers, e.g. electron-hole pairs 207.

The electric potential gradient 204 enables efficient collection of secondary interaction charge carriers, e.g. electron-hole pairs 207, generated within the electric insulator 203. Incident neutron radiation 205 strikes and interacts with the neutron-sensitive material coating the neutron-sensitive electrode 201. As a result, high-energy particles 206 are ejected from the neutron-sensitive material. The high-energy level of the high-energy particles 206 results from energy generated in nuclear reactions caused when the incident neutron radiation 205 interacts with nuclei in the neutron-sensitive material coating the sensitive electrode 201. As the high-energy particles 206 propagate through the electric insulator 203, they create electron-hole pairs within the electric insulator 203. The process by which the high-energy particles 206 interact with the electric insulator 203 to create electron-hole pairs can be referred to as charge amplification. The electrons and holes that together constitute the electron-hole pairs 207 can be individually referred to as secondary interaction charge carriers.

During operation of the neutron sensing device 200, the secondary charge carriers that constitute the electron-hole pairs 207 produced by nuclear reactions between the high-energy particles 206 and nuclei of the neutron-sensitive material coating the neutron-sensitive electrode 201 drift, depending on their charge, towards one of the opposing electrode 202 and the neutron-sensitive electrode 201. As larger numbers of secondary charge carriers collect near the opposing electrode 202 and the neutron-sensitive electrode, the electric potential gradient 204 increases in magnitude. The magnitude of the electric potential gradient 204 can therefore be utilized to determine the cumulative neutron exposure experienced by the neutron sensor 200. For example, if the neutron-sensitive material coating the neutron-sensitive electrode 201 were a thin gadolinium foil having a 2.9 eV work function and the opposing electrode 202 were constructed from copper having a 4.9 eV work function, the natural electric potential difference between the electrodes 201 and 202 would be equal to 2 V prior to the neutron-sensitive device 200 being exposed to neutrons. Incident neutron radiation 205 generates high-energy particles 206 (which in the embodiment depicted in FIG. 2 are high-energy electrons) and gamma-rays that generate the electron-hole pairs 207 within the electric insulator 203 as they propagate through it. For example, if a neutron capture event in gadolinium generates 75 keV of energy which is carried by two high-energy particles, which in this case, are electrons and, the energy required to generate an electron-hole pair within the electric insulator 203 is roughly 15 eV and further assuming that all of the energy produced by the neutron capture event is coupled into generation of the electron-hole pairs 207, the single neutron capture event would produce five thousand electron-hole pairs, or ten thousand secondary charge carriers. This charge amplification provided by the built in electric potential gradient 204 can greatly improve the neutron sensitivity of a zero-power sensor, such as the neutron-sensitive device.

Figure 3:
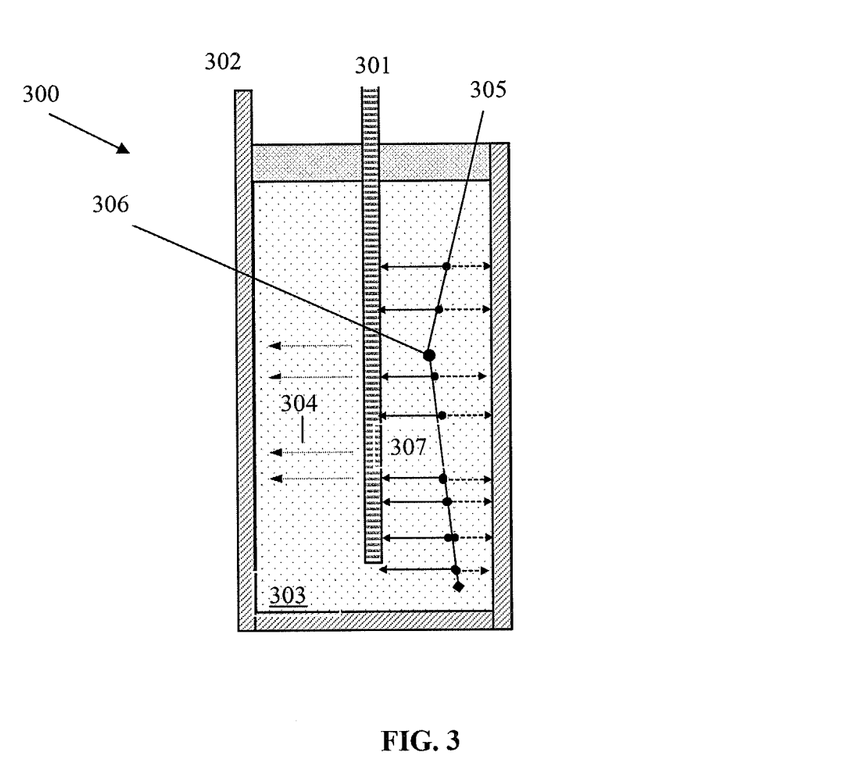
FIG. 3 depicts a neutron sensing device having two electrodes separated by an electric insulator within which neutron-sensitive material is embedded according to an aspect of the invention.

FIG. 3 depicts a neutron sensing device 300 having two electrodes separated by an electric insulator 303 within which neutron-sensitive material is embedded. The neutron sensing device 300 includes a first electrode 301, a second electrode 302, and the electric insulator 303 within which neutron-sensitive material is embedded. In this configuration, the electrode materials can be configured independently of the neutron-sensitive material. One or both of the electrodes 301 and 302 may also be made from or coated by neutron-sensitive materials. Neutron-sensitive material may also be embedded within one or both of the electrodes 301 and 302. The materials used for the first electrode 301 and the second electrode 302 are selected such that an electric potential gradient 304 is created between the first electrode 301 and the second electrode 302. Specifically, electrode materials are selected that differ with respect to, e.g., work function, dopant type, dopant concentration, and surface binding potential for charge carriers. Such differences give rise to an electric potential difference when the electric insulator 303 is disposed between the first electrode 301 and the second electrode 302. Large magnitudes of the built-in electric potential gradient 304 can be achieved through appropriate configuration of the first electrode 301 and the second electrode 302. In one embodiment, the first electrode 301 is an aluminum electrode with a thin anodization layer and the second electrode 302 is a copper electrode. In the embodiment, the built-in electric potential gradient 304 is a result of an electric potential difference of over 5 V between the first electrode 301 and the second electrode 302.

High-energy particles 305 are generated by nuclear reactions involving incident neutron radiation 306 and nuclei of the neutron-sensitive material embedded in the electric insulator 303. As the high-energy particles 305 propagate through the electric insulator 303 they create electron hole-pairs 306, i.e. secondary charge carriers, within the electric insulator 303 before being absorbed into the electrodes 301 and 302. The electric potential gradient 304 causes the secondary charge carriers constituting the electron-hole pairs 306 to drift towards one of the first electrode 301 or the second electrode 302.

Figure 4:
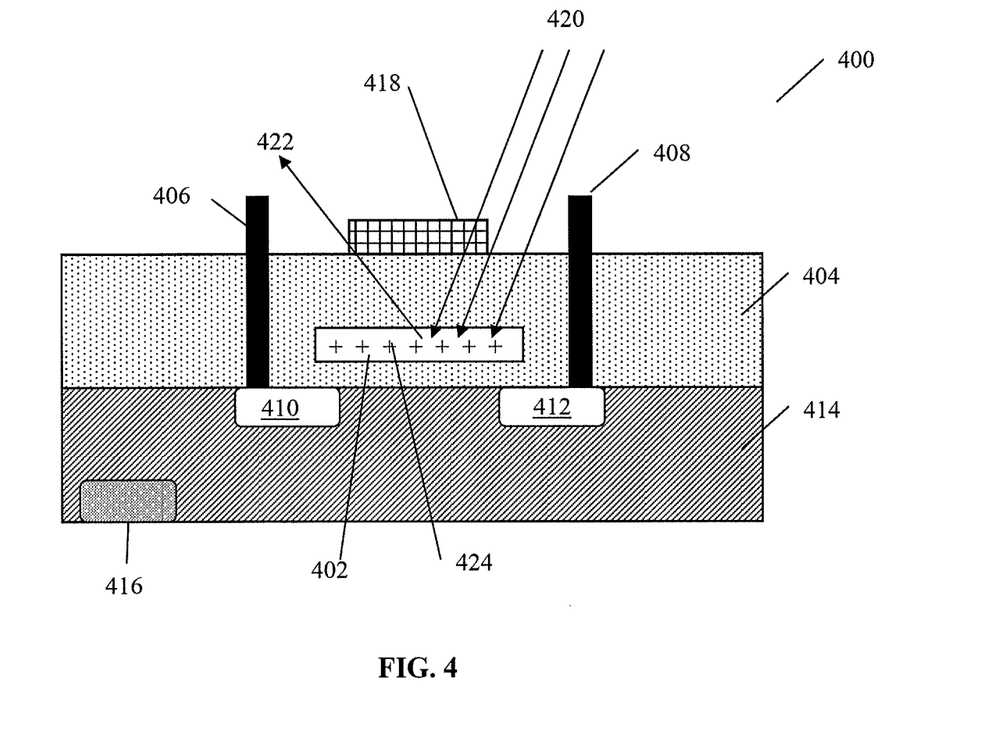
FIG. 4 depicts a neutron-sensitive metal oxide semiconductor field effect transistor (MOSFET) according to an aspect of the invention.

FIG. 4 depicts a neutron-sensitive metal oxide semiconductor field effect transistor (MOSFET). The MOSFET device 400 includes a neutron-sensitive floating gate 402 surrounded by a dielectric material 404, a source line 406, a bit line (or drain) 408, a source line channel contact 410, a bit line channel contact 412, semiconductor substrate 414, and body contact 416. In various embodiments, the source line channel contact 410, the bit line channel contact 412, the semiconductor substrate 414, and the body contact 416 may be either n-doped or p-doped. In various embodiments, the MOSFET device 400 may utilize a variety of different materials and be constructed through a variety of different processes. For example, the neutron-sensitive floating gate 402 may be constructed from a material including but not limited to any of gadolinium, lithium, and boron. The neutron-sensitive floating gate 402 may be constructed from a variety of other materials as well. The dielectric material 404 may be constructed from materials that include but are not limited to silicon dioxide, silicon nitride, III-V materials such as GaN, and II-VI materials such as AlN. The semiconductor substrate 414 may be constructed of either p-doped or n-doped semiconductor materials. Standard CMOS processing techniques can be used to construct the source line channel contact 410, the bit line channel contact 412, a control gate 418, the source line 406, and the bit line 408.

During operation of the MOSFET device 400, neutron radiation 420 interacts with the material that constitutes the neutron-sensitive floating gate 402 resulting in the ejection of high-energy charge carriers 422. An accumulated electric charge 424 on the neutron-sensitive floating gate 402 results from the ejection of the high-energy charge carriers 422 and the accumulation of low-energy charge carriers, e.g. electron-hole pairs, within the dielectric material 404. The dielectric material 404 inhibits the flow of charge to and from the floating gate 402 such that charge can accumulate and form a gate bias thereby allowing the MOSFET device 400 to function as a transistor. The dielectric material 404 thereby confines the accumulated electric charge 424 to the neutron-sensitive floating gate 402 for a relatively long period of time depending on the leakage characteristics of the dielectric material 404. For example, flash memory sticks used for storing information in digital media are constructed with very low leakage dielectric materials to allow storage of gate bias for hundreds of years. The accumulated electric charge 424 forms on the neutron-sensitive floating gate in the first instance as a result of the inability of the dielectric material 404 to prevent the flow of the high-energy charge carriers 422 from the neutron-sensitive floating gate 402 into the surrounding material, e.g. the semiconductor substrate 414. High-energy charge carriers 422 are produced from nuclear reactions involving neutrons and the neutron-sensitive materials forming, at least in part, the neutron-sensitive floating gate. In the embodiment depicted in FIG. 4, the high-energy charge carriers 422 ejected from the neutron-sensitive floating gate 402 are high-energy electrons and the residual electric charge 424 is a positive electric charge.

In various embodiments, the neutron-sensitive floating gate 402 and the semiconductor substrate 414 are formed of materials selected to produce a built-in electric potential difference between the neutron-sensitive floating gate 402 and the semiconductor substrate 414. Natural built-in potentials can be achieved through use of materials with different work functions, electron affinities, dopant concentrations, and electronic structures to engineer a natural built-in potential. Low-energy charge carriers, such as electron-hole pairs, formed within the insulating dielectric material 404 can add to the accumulated charge 424 on the gate when drifting towards or away from the floating gate 402. This increases the detection and resolution sensitivity of the MOSFET device 400 to incident neutrons.

The accumulated electric charge 424 on the neutron-sensitive floating gate 402 alters the conducting properties of the MOSFET device 400. Specifically, the accumulated electric charge 424 alters the resistance of the transistor channel (the path between the source line channel contact 410 and the bit line channel contact 412). For a given voltage applied between the source line 406 and the bit line 408, the modification of the resistance of the transistor channel engendered by the accumulated electric charge 424 on the neutron-sensitive floating gate 402 can cause the MOSFET device 400 to either conduct charge between the source line 406 and the bit line 408 or to stop conducting charge between the source line 406 and the bit line 408 depending on the configuration. For configurations where the accumulated electric charge 424 on the neutron-sensitive floating gate 402 causes the transistor channel to conduct, the magnitude of the current across the transistor channel is, for a given voltage applied across the source line 406 and the bit line 408, related to the magnitude of the residual electric charge on the neutron-sensitive floating gate.

A body contact 416 is typically connected to the source line 406 but can be biased independently to further alter the resistance, and thereby the conduction threshold, of the transistor channel. In various embodiments, the MOSFET device 400 further includes a control gate 418. The control gate 418 can be biased relative to the body contact 416 to further modify the conditions under which the MOSFET device 400 will conduct and the amount of current through the MOSFET for a given voltage applied across the source line 406 and the bit line 408. Regardless of the relative bias of the control gate 418 and the body contact 416, the voltage applied between the source line 406 and the bit line 408, and the concentration of dopants in the semiconductor substrate 414, the accumulated electric charge 424 on the neutron-sensitive floating gate 402 will affect the electronic properties of the MOSFET device 400. Selecting various combinations of the relative bias of the control gate 418 and the body contact 416 as well as dopant concentrations in the various materials, such as semiconductor substrate 414, impacts the magnitude of the neutron exposure necessary to produce a measurable impact on the electronic properties of the MOSFET device 400 for a given electric potential difference between the source line 406 and the bit line 408. In various embodiments, it may be possible to quantify the cumulative neutron exposure by measuring the electronic properties of the MOSFET device 400.

In various embodiments, the MOSFET device 400 may includes an injector gate. The injector gate can be configured to remove or adjust the residual electric charge on the neutron-sensitive floating gate 402. For example, an external circuit can apply a charge via a quantum tunneling transfer process to add or subtract charge on the gate. Such techniques are commonly used with flash memory devices to erase or reset transistors. The inclusion of the injector gate within the MOSFET device 400 enhances the functionality of the MOSFET device 400 and enables such devices to be utilized in applications where it is necessary to determine cumulative neutron exposure for defined time intervals by allowing the accumulated charge 424 on the neutron-sensitive floating gate 402 to be reset. Such applications include flash memory arrays, flat panel detectors for medical and industrial imaging, and wearable personal dosimeters.

The residual electric charge 424 on the neutron-sensitive floating gate 402 can also be utilized for other processes mediated by high-potential, stored charge, or semiconductor effects. For example, if the residual electric charge 424 on the neutron-sensitive floating gate 402 indicates a cumulative neutron dose that exceeds a threshold, a particular response can be triggered through an external circuit.

Figure 5:
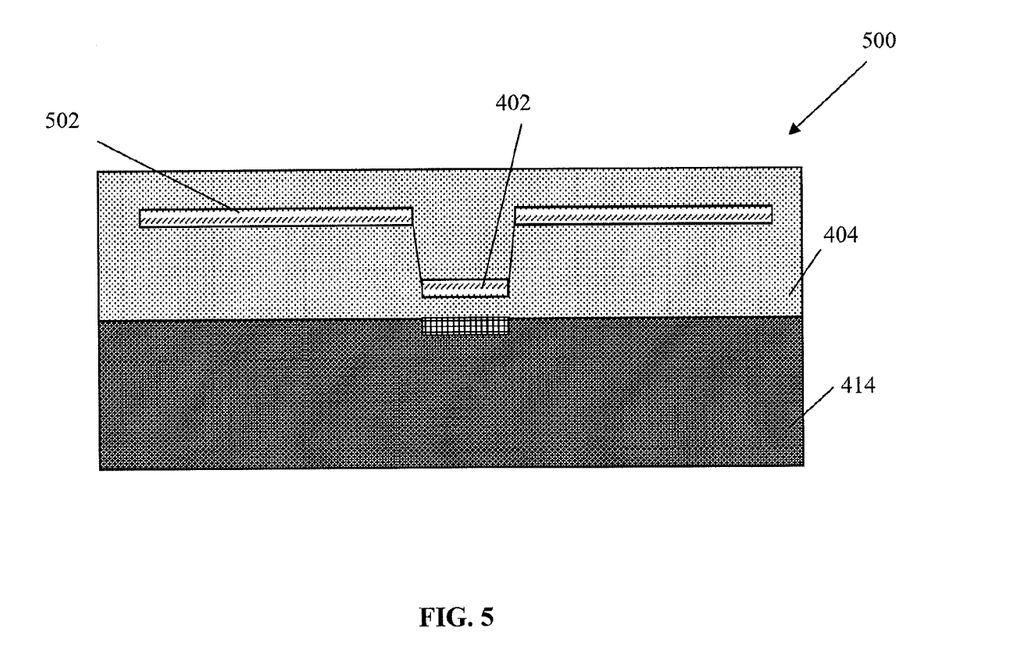
FIG. 5 depicts a neutron-sensitive metal oxide semiconductor field effect transistor (MOSFET) having a wide area neutron sensor according to an aspect of the invention.

FIG. 5 depicts a neutron-sensitive metal oxide semiconductor field effect transistor (MOSFET) having a wide area neutron sensor. The MOSFET device 500 includes each of the components of the MOSFET device 400 depicted in FIG. 4 but additionally includes a wide area neutron sensor 502 electrically connected to the neutron-sensitive floating gate 402. The wide area neutron sensor 502 increases the sensitivity to neutrons of the MOSFET device 500 as compared to the sensitivity to neutrons of the MOSFET device 400. The inclusion of the wide area neutron sensor 502 can provide a marked increase in neutron sensitivity to transistor size ratio.

Figure 6:
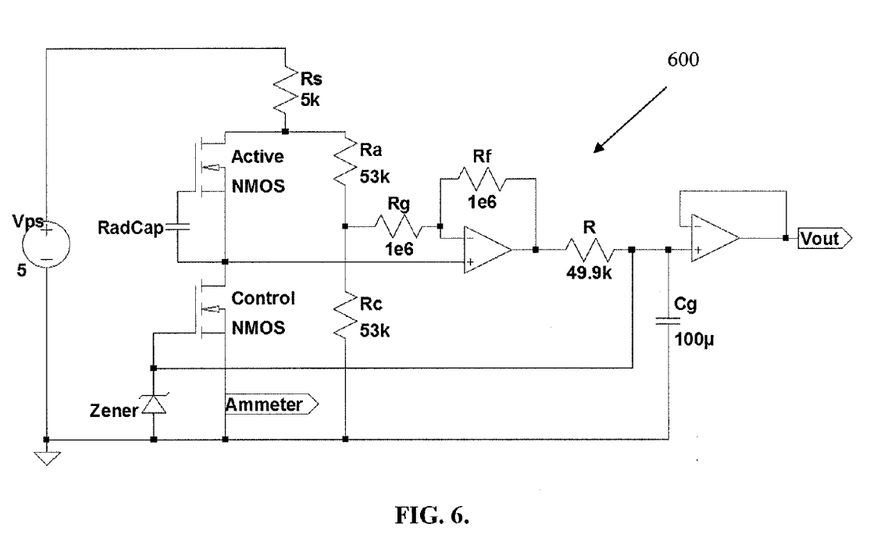
FIG. 6 depicts a neutron measurement circuit including a neutron-sensitive metal oxide semiconductor field effect transistor (MOSFET) according to an aspect of the invention.

FIG. 6 depicts a neutron measurement circuit 600 including a neutron-sensitive metal oxide semiconductor field effect transistor (MOSFET). Passive, zero-power detection of neutron exposure can be achieved through incorporating neutron-sensitive MOSFET devices, such as MOSFET device 400 and MOSFET device 500, into measurement circuits, such as measurement circuit 600. Measurement circuits enable neutron capture and charge carrier emission properties of neutron-sensitive materials to be leveraged for neutron detection and neutron exposure quantification. In the measurement circuit depicted in FIG. 6, the I-V characteristic of the neutron-sensitive MOSFET device varies as neutrons interact with the neutron-sensitive MOSFET device. In various embodiments, measurement circuits are configured to detect a binary on or off state of the transistor where the transition from one state to the other is indicative of a threshold neutron exposure level. In other embodiments, measurement circuits are configured to determine a quantifiable level of neutron exposure as determined by a quantifiable value of electric current across a neutron-sensitive MOSFET device for a given electric potential difference applied across source and drain electrodes of the neutron-sensitive MOSFET device.

In various embodiments, the neutron-sensitive MOSFET device, such as the MOSFET device 400 and the MOSFET device 500, may be a removable component from the measurement circuit. In such implementations, the neutron-sensitive MOSFET device may monitor cumulative neutron exposure and subsequently be inserted into the measurement circuit in order to ascertain the cumulative neutron exposure.

More complicated measurement circuits can be constructed in which the neutron-sensitive MOSFET device is paired with neutron insensitive circuit components capable of measuring x-ray radiation, gamma-ray radiation, other high-energy particle interactions, and temperature changes. Such additional components can be utilized to measure physical processes that may alter the electronic properties of the MOSFET device. For example, such additional components can be utilized to provide an approximation of the residual charge that has leaked out of a neutron-sensitive element of the MOSFET device. Similarly, measurement circuits may be constructed that include multiple neutron-sensitive MOSFET devices having different levels of neutron sensitivity in order to detect multiple thresholds of neutron exposure and to achieve more precise measurements of neutron exposure levels.

Figure 7:
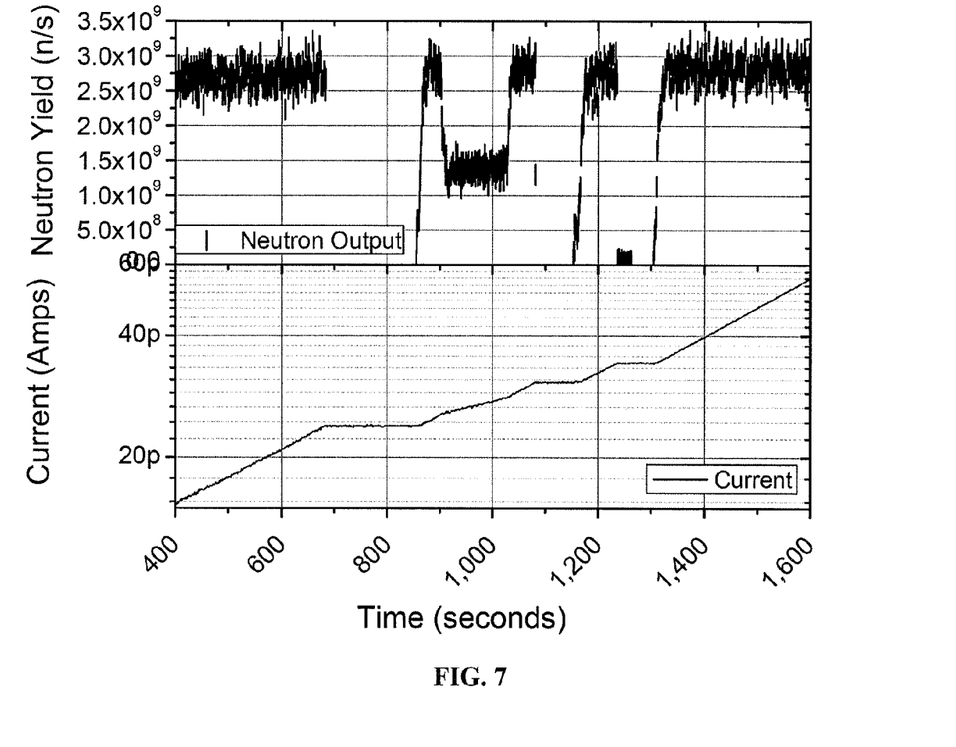
FIG. 7 is a graph of neutron output of a neutron generator as a function of time and electric current through a neutron-sensitive metal oxide semiconductor field effect transistor (MOSFET) exposed to the neutron output of the neutron generator as a function of time.

FIG. 7 is a graph of neutron output of a neutron generator as a function of time and electric current through a neutron-sensitive metal oxide semiconductor field effect transistor (MOSFET) exposed to the neutron output of the neutron generator as a function of time. The current measured by the ammeter probe is proportional to the level of electric charge stored on the gate electrode of the MOSFET device. As can be seen from FIG. 7, as the cumulative neutron exposure increases, the current measured by the ammeter probe also increases. Furthermore, the rate at which the cumulative neutron exposure increases is directly related to the rate of increase of the current measured by the gate ammeter probe. The graph depicted in FIG. 7 was produced using the electronic circuit shown in FIG. 6 and is only a single example of how a neutron sensor according to an embodiment can be used.

Figure 8:
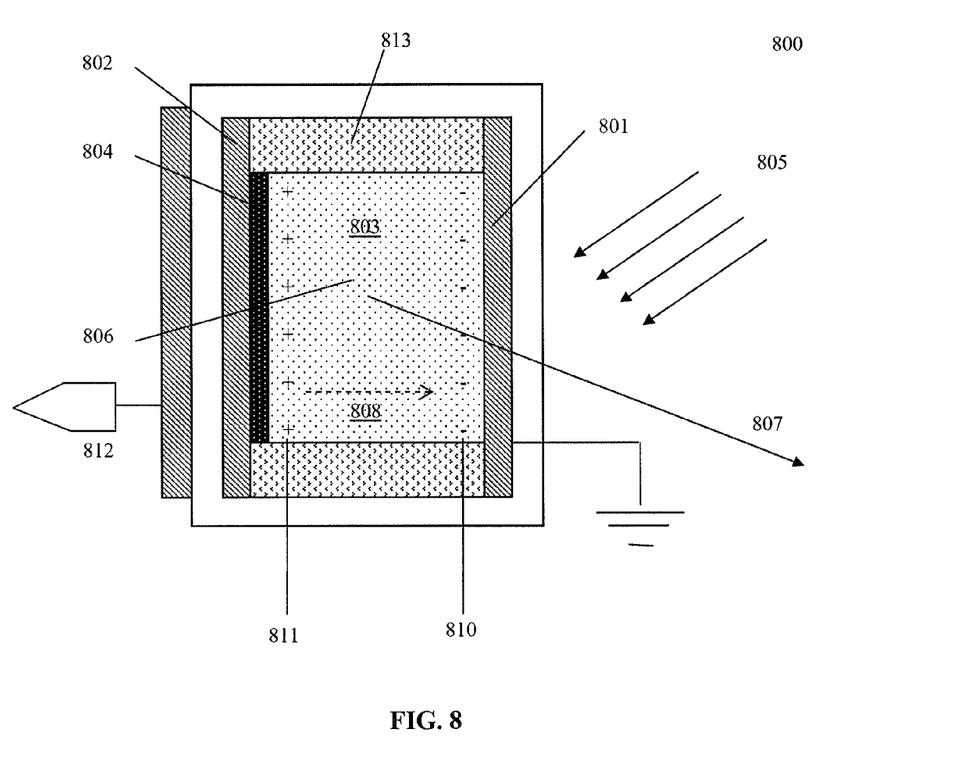
FIG. 8 depicts a neutron-sensitive self-biasing capacitor according to an aspect of the invention.

FIG. 8 depicts a neutron-sensitive self-biasing capacitor 800. Neutron-sensitive self-biasing capacitor device 800 includes a first electrode plate 801, a second electrode plate 802, an insulating material 803 and a neutron-sensitive material 804. Incident neutron radiation 805 interacts with the neutron-sensitive material 804, generating high-energy charge carriers 807 which can generate additional low-energy charge carriers 808 within the insulating material 803 that drift to opposing electrodes 801 and 802 and generate a potential difference across the capacitor 800. In the embodiment depicted in FIG. 8, the first electrode plate 801 and the second electrode plate 802 are parallel, although a variety of additional implementations may include electrode plates that are not arranged in parallel plate geometries. The first electrode plate 801 includes a neutron-sensitive material 804. In various embodiments, the neutron-sensitive material 804 may coat the surface of the first electrode plate 801, may be used to construct the first electrode plate 801, or may be integrated within the insulating material 803. In the embodiment depicted in FIG. 8, the second electrode plate 802 is constructed from neutron insensitive materials. Incident neutron radiation 805 interacts with the neutron-sensitive material 804 thereby ejecting high-energy charge carriers 807 from the neutron-sensitive material 804. The high-energy of the high-energy charge carriers 808 results from energy generated in nuclear reactions caused when the incident neutron radiation 805 interacts with the neutron-sensitive material 804. Low-energy charge carriers 808 can also be generated by the interaction of the high-energy charge carriers 807 with materials, in particular the insulating dielectric material 803. The ejection of the high-energy charge carriers 807 from the neutron-sensitive material 804 and the generation of low-energy charge carriers 808 from interactions involving high-energy charge carriers 807 and their surrounding materials leaves an accumulated electric charge 810 on the first electrode plate 801 and an opposing electric charge 811 on the second electrode plate 802. In the embodiment depicted in FIG. 8, the high-energy charge carriers 807 are high-energy electrons and the accumulated electric charge 810 is a positive charge.

In various embodiments, the first electrode plate 801 and the second electrode plate 802 can be configured to provide a built-in electric potential gradient between the first electrode plate 801 and the second electrode plate 802 in order to collect electrons and holes resulting from the generation of electron-hole pairs within the neutron-sensitive material 804.

Embodiments of the neutron-sensitive self-biasing capacitor device 800 may also include a pulse-coupling electrode 812. The pulse coupling electrode 812 enables pulse coupling between the neutron-sensitive self-biasing capacitor device 800 and an external circuit and further enables the first electrode plate 801 to be electrically isolated from the remainder of the self-biasing capacitor device 800. Pulse coupling allows for information on the status of the neutron-sensitive self-biasing capacitor to be communicated externally thereby shorting out accumulated charge on the capacitor and can further allow for the resetting of the capacitor via quantum tunneling.

A gap 813 between the first electrode plate 801 and the second electrode plate 802 can be, in various embodiments, either evacuated or filled with a dielectric to prevent charge leakage. In various embodiments, the gap 813 is filled with a non-linear dielectric and the pulse-coupling electrode 812 is provided in order to determine the charge on the first electrode plate 801. The charge on the first electrode plate 801 is determined by measuring the capacitance between the pulse coupling electrode 812 and the second electrode plate 802 (which is a function of the charge on the first electrode plate 801 by virtue of the effect of the non-linear dielectric).

Applications for the neutron-sensitive self-biasing capacitor device 800 include neutron exposure measurement, triggering and completing external circuitry, and plasma creation.

Figure 9:
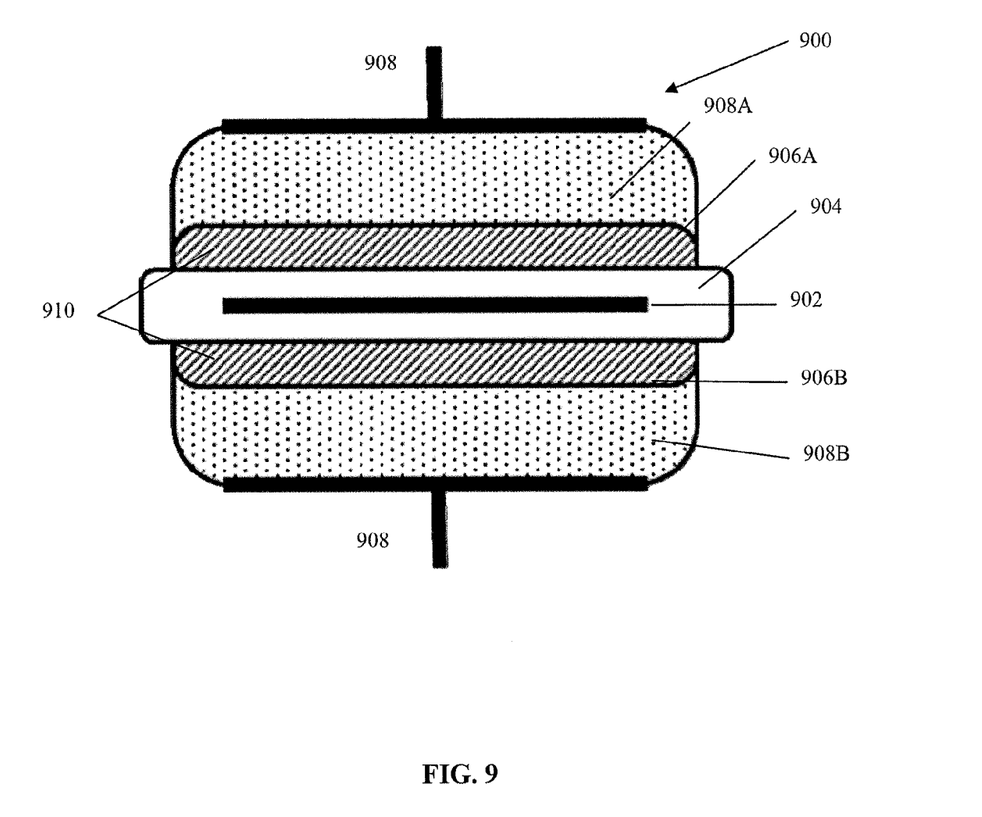
FIG. 9 depicts a neutron-sensitive metal oxide semiconductor capacitor (MOSCAP) according to an aspect of the invention.

FIG. 9 depicts a neutron-sensitive metal oxide semiconductor capacitor (MOSCAP). The MOSCAP device 900 includes a neutron-sensitive material 902, an electric insulator 904, a first semiconductor electrode 906A positioned adjacent to a first outer surface of the electric insulator 904 and connected to a first electrical lead 908A, and a second semiconductor electrode 906B positioned adjacent to a second outer surface of the electric insulator 904 and connected to a second electrical lead 908B. The neutron-sensitive material 902 is positioned between the first semiconductor electrode 906A and the second semiconductor electrode 906B and the electric insulator 904 forms an insulating barrier between the first semiconductor electrode 906A and the second semiconductor electrode 906B.

During operation of the MOSCAP device 900, the neutron-sensitive material 902 accumulates a residual electric charge as a result of interaction with incident neutrons DD. Incident neutrons DD interact with the neutron-sensitive material 902 to produce high-energy charge carriers that propagate out of the neutron-sensitive material 902 and thereby leave a residual electric charge on the neutron-sensitive material. The residual electric charge produces a depletion layer 910 in the first semiconducting electrode 906A and the second semiconducting electrode 906B. The depletion layer 910 causes a decrease in capacitance across the first semiconducting electrode 906A and the second semiconducting electrodes 906B. This change in capacitance can be measured across electrical leads 908. The change in capacitance can be used to determine the level of cumulative neutron exposure.

Example applications include matching the MOSCAP device 900 with a device not sensitive to radiation for reliable comparative measurement. One way of using this paired coupling is to have two oscillators whose frequency is controlled by these capacitors and mix their outputs to generate a beat frequency. As the neutron-sensitive MOSCAP changes its capacitance in response to increasing cumulative neutron exposure, the beat frequency will change. A frequency-based measurement such as this provides good way of measuring and transmitting capacitance change, which is correlated with neutron exposure, in applications where the supplied power and/or probing distance are not fixed, such as RFID applications.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A system for detecting exposure to neutrons, the system comprising:
   an interior electrode; and an electric insulator disposed between the interior electrode and an exterior region so as to enclose a region occupied by the interior electrode, wherein the interior electrode and electric insulator structures are, together, configured to store charge carriers on the interior electrode, wherein the charge carriers are produced when neutron radiation interacts with neutron-sensitive material resulting in ejection of high-energy particles, wherein the neutron-sensitive material: makes up, is contained within and/or is proximate the interior electrode, and wherein the electric insulator is configured to inhibit propagation of the charge carriers stored by the interior electrode to the exterior region to maintain an electric charge build-up of the charge carriers produced by the neutron radiation interaction with the neutron-sensitive material.

2. The system of claim 1, wherein the electric insulator is configured to allow the high-energy particles to propagate from the neutron-sensitive material to one or more of the exterior region and the interior electrode.

3. The system of claim 1, wherein the ejection of high-energy particles from the neutron-sensitive material produces an electric charge accumulation on the neutron-sensitive material.

4. The system of claim 1, wherein the high-energy particles ejected from the neutron-sensitive material produce electron-hole pairs in the electric insulator.

5. The system of claim 4, further comprising an exterior electrode positioned adjacent to the outer surface of the electric insulator, separated from the interior electrode by the electric insulator, and configured to store a portion of the charge carriers produced by the high-energy particles.

6. The system of claim 5, wherein an electric potential gradient is produced within the electric insulator by a combination of a property of the interior electrode and a property of the exterior electrode, wherein the combination is one or more of:
 a difference in a work function of the interior electrode and a work function of the exterior electrode,
 a difference in a dopant type of the interior electrode and a dopant type of the exterior electrode;
 a difference in a dopant concentration of the interior electrode and a dopant concentration of the exterior electrode, and
 a difference in a charge carrier surface binding potential of the interior electrode and a corresponding charge carrier surface binding potential of the exterior electrode.

7. The system of claim 1, further comprising:
a semiconductor substrate;
a source line channel contact at least partially embedded within the semiconductor substrate and connected to a source line; and
a bit line channel contact at least partially embedded within in the semiconductor substrate and connected to a bit line;
wherein a portion of the semiconductor substrate forms a conducting channel between the source line channel contact and the bit line channel contact,
wherein the interior electrode is separated from the conducting channel by the electric insulator, and
wherein an aggregate electrical charge of the charge carriers stored by the interior electrode determines, at least in part, a resistance of the conducting channel.

8. The system of claim 7, further comprising a control gate positioned adjacent to the outer surface of the electric insulator;
wherein the control gate is separated from the semiconductor substrate, the source line channel contact, the bit line channel contact, and the interior electrode by the electric insulator.

9. The system of claim 7, further comprising a body contact in electrical contact with the semiconductor substrate and configured to modify a conducting threshold of the conducting channel.

10. The system of claim 9, further comprising:
an inductor connected to the first electrical lead and the second electrical lead; and
a neutron insensitive resonator circuit;
wherein the inductor, the first electrical lead, the second electrical lead, the first semiconductor substrate, and the second semiconductor substrate are configured to form a neutron-sensitive resonator circuit, and
wherein the resonant frequency of the neutron-sensitive resonator circuit is determined, at least partially, by the cumulative exposure of the neutron sensing element to neutrons.

11. The system of claim 1, further comprising:
a first semiconductor electrode positioned adjacent to a first portion of the outer surface of the electric insulator and connected to a first electrical lead; and
a second semiconductor electrode positioned adjacent to a second portion of the outer surface of the electric insulator and connected to a second electrical lead;
wherein the interior electrode is positioned between the first semiconductor electrode and the second semiconductor electrode,
wherein the electric insulator includes a first portion disposed between the interior electrode and the first semiconductor electrode and a second portion disposed between the interior electrode and the second semiconductor electrode; and
wherein an aggregate electrical charge of the charge carriers stored by the interior electrode determines, at least in part, a ratio of electric charge on the first semiconductor electrode and the second semiconductor electrode to an electric potential difference applied between the first electrical lead and the second electrical lead.

12. The system of claim 11, further comprising an output mixer configured to generate a beat frequency by mixing the outputs of the neutron-sensitive resonator circuit and the neutron insensitive resonator circuit.

13. The system of claim 1, further comprising a neutron insensitive electrode plate separated from the neutron-sensitive material by the electric insulator;
wherein the neutron-sensitive material is configured as a neutron-sensitive electrode.

14. The system of claim 13, wherein the electric insulator is a nonlinear dielectric.

15. The system of claim 14, further comprising a pulse-coupling electrode coupled to an external circuit;
wherein the external circuit is configured to measure the capacitance between the pulse coupling electrode and the neutron insensitive electrode plate.

16. A method for detecting exposure to neutrons comprising:
providing an interior electrode and an electric insulator, wherein the interior electrode and electric insulator structures are, together, configured to store charge carriers on the interior electrode by disposing the electric insulator between the interior electrode and an exterior region so as to enclose a region occupied by the interior electrode;

producing high-energy particles via nuclear reactions involving neutron radiation interacting with neutron sensitive material, wherein the neutron-sensitive material: makes up, is contained within and/or is proximate the interior electrode;

generating, by the high-energy particles, charge carriers;

storing of the charge carriers, generated by the high-energy particles, on the interior electrode;

maintaining an electric charge build-up of the charge carriers, produced by the neutron radiation interacting with the neutron-sensitive material, by inhibiting propagation of the charge carriers stored by the interior electrode to the exterior region; and detecting an electric potential difference between the interior electrode and the exterior region.

17. The method of claim 16, further comprising:
providing a semiconductor substrate, a portion of which forms a conducting channel;
electrically insulating the neutron-sensitive material from the semiconductor substrate with the electric insulator; and
providing a source line channel contact at least partially embedded within the semiconductor substrate and connected to a source line and a bit line channel contact at least partially embedded within in the semiconductor substrate and connected to a bit line;
wherein detecting an electric potential difference between the interior electrode and the exterior region comprises applying an electric potential across the source line and the bit line and measuring an electric current through the conduction channel.

18. The method of claim 17, further comprising:
providing an inductor connected to the first electrical lead and the second electrical lead to form a neutron-sensitive resonator circuit;
providing a neutron insensitive resonator circuit;
connecting an output of the neutron-sensitive resonator circuit and an output of the neutron insensitive resonator circuit to an output mixer; and
measuring a beat frequency of the output mixer.

19. The method of claim 16, further comprising:
providing a first semiconductor electrode and a second semiconductor electrode;
positioning the neutron-sensitive material between the first semiconductor electrode and the second semiconductor electrode and positioning an electric insulator between the neutron-sensitive material and the first semiconductor electrode and the second semiconductor electrode;
connecting the first semiconductor electrode to a first electrical lead;
connecting the second semiconductor electrode to a second electrical lead; and
applying an electric potential difference between the first electrical lead and the second electrical lead;
wherein detecting a residual charge on the neutron-sensitive material that has stored as a result of exposure to neutrons comprises measuring a residual electric charge on the first semiconductor electrode and the second semiconductor electrode.

20. A system for detecting neutrons comprising:
a plurality of a neutron sensing elements, each including:
an interior electrode; and
an electric insulator disposed between the interior electrode and an exterior region so as to enclose a region occupied by the interior electrode,
wherein the interior electrode and electric insulator structures are, together, configured to store charge carriers on the interior electrode,
wherein the charge carriers are produced when neutron radiation interacts with neutron-sensitive material resulting in ejection of high-energy particles,
wherein the neutron-sensitive material: makes up, is contained within and/or is proximate the interior electrode, and
wherein the electric insulator is configured to inhibit propagation of the charge carriers stored by the interior electrode to the exterior region to maintain an electric charge build-up of the charge carriers produced by the neutron radiation interaction with the neutron-sensitive material, and
wherein the plurality of neutron-sensing elements is disposed in an array.

* * * * *